UNITED STATES PATENT OFFICE.

LUDWIG WOLMAN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

935,878. Specification of Letters Patent. Patented Oct. 5, 1909.

No Drawing. Application filed May 29, 1909. Serial No. 499,146.

*To all whom it may concern:*

Be it known that I, LUDWIG WOLMAN, doctor of philosophy, chemist, citizen of the German Empire, residing at Elberfeld, Germany, have invented new and useful Improvements in Vat Dye, of which the following is a specification.

My invention relates to the production of new anthracene derivatives. They are obtained by converting an aminoanthraquinone into its derivatives containing in the amino group the radical of an anthraquinone carboxylic acid ($C_{14}H_7O_2.CO-$). The reaction is carried out by treating an aminoanthraquinone with an anthraquinone carboxylic acid.

The new products are after being dried and pulverized colored powders practically insoluble in water; soluble in concentrated sulfuric acid with from a yellow to red color. They yield on treatment with hydrosulfite and caustic soda lye brownish vats suitable for dyeing and printing the textile fiber from yellow to red to brown shades. They also form valuable lakes.

In order to illustrate the new process I can proceed as follows, the parts being by weight:—10 parts of anthraquinone-2-carboxylic acid are heated with 200 parts of nitrobenzene and 6 parts of $SOCl_2$ to 140° C. After cooling to 100° C. 10 parts of 1-aminoanthraquinone are added and the mixture is heated for 1-2 hours to 110-120° C. The new condensation product crystallizes from the cooling melt in the shape of yellow crystals which are filtered off, washed with alcohol and water and dried. They are soluble in pyridin with a yellow color, in concentrated sulfuric acid with a yellow color. By treatment with hydrosulfite and NaOH a brownish vat is obtained which dyes cotton, wool or silk pure greenish-yellow shades.

Other aminoanthraquinones or other anthraquinone carboxylic acids may be used.

Products of similar qualities are thus obtained, *e. g.* from 1.4-diaminoanthraquinone and anthraquinone-2-carboxylic acid (dyes reddish-brown), from 1.5-diaminoanthraquinone and anthraquinone-2-carboxylic acid (dyes orange-yellow), from 1-amino-5-chloroanthraquinone and anthraquinone-2-carboxylic acid (dyes yellow), from 1-amino-4-methoxyanthraquinone and anthraquinone-2-carboxylic acid (dyes orange).

I claim:—

1. The herein described new vat dyestuffs of the anthracene series which can be obtained from an aminoanthraquinone and an anthraquinone carboxylic acid, which dyestuffs are, after being dried and pulverized, colored powders practically insoluble in water, soluble in concentrated sulfuric acid with a yellow to red color; giving brownish vats with hydrosulfite and caustic soda lye, which vats dye the textile fiber from yellow to red to brown shades, substantially as described.

2. The herein described new vat dyestuff of the anthracene series which is the anthraquinonyl-carbonyl-1-aminoanthraquinone, which dyestuff is, after being dried and pulverized, a yellow powder which is soluble in pyridin with a yellow color; soluble in concentrated sulfuric acid with a yellow color; giving a brownish vat with hydrosulfite and caustic soda lye, which vat dyes the textile fiber greenish-yellow shades, substantially as described.

In testimony whereof I have hereunto set my hand in the presence of two subscribing witnesses.

LUDWIG WOLMAN. [L. S.]

Witnesses:
 OTTO KÖNIG,
 WILLY KLEIN.